3,162,665
HALOALLYL METHANETHIOSULFONATES
Karoly Szabo, Yonkers, N.Y., and Thomas B. Williamson, Santa Clara, Calif., assignors to Stauffer Chemical Company, New York, N.Y., a corporation of Delaware
No Drawing. Filed Oct. 10, 1961, Ser. No. 144,049
5 Claims. (Cl. 260—453)

This invention relates to certain halogenated unsaturated thiosulfonates and, in particular, to halogenated allylmethanethiosulfonates and their preparation. The invention also pertains to biocidal compositions containing as the active component thereof, at least one of the aforesaid halogenated unsaturated thiosulfonates and to methods of preparing, using and applying such compositions.

The compounds of this invention can be represented structurally by the following general formula:

I. $CXY=CZ-CH_2-S-SO_2-CH_3$ wherein X, Y and Z designate hydrogen, halogen or bromine, it being understood that at least one of said X, Y and Z is always equal to bromine or chlorine. Specific structures falling within the ambit of the aforesaid formula are listed below.

Compound 1:

$CClBr=CBr-CH_2-S-SO_2-CH_3$

Compound 2:

$CCl_2=CH-CH_2-S-SO_2-CH_3$

Compound 3:

$CBr_2=CH-CH_2-S-SO_2-CH_3$

Compound 4:

$CH_2=CBr-CH_2-S-SO_2-CH_3$

Compound 5:

$CCl_2=CCl-CH_2-S-SO_2-CH_3$

Compound 6:

$CBr_2=CCl-CH_2-S-SO_2-CH_3$

Compound 7:

$CH_2=CCl-CH_2-S-SO_2-CH_3$

Compound 8:

$CHBr=CBr-CH_2-S-SO_2-CH_3$

Compound 9:

$CHCl=CH-CH_2-S-SO_2-CH_3$

Compound 10:

$CBr_2=CBr-CH_2-S-SO_2-CH_3$

In obtaining the herein contemplated halogenated allyl esters of methanethiosulfonic acid, a polyhalopropene having the formula:

II. $CXY=CZ-CH_2Hal.$ wherein X, Y and Z have the values previously assigned and Hal. represents halogen such as chlorine or bromine is reacted with a salt of methanethiosulfonic acid. The reaction is presumed to take place as schematically illustrated in the chemical equation given below:

$CXY=CZ-CH_2-\boxed{Hal.M}-S-SO_2-CH_3 \longrightarrow$
$CXY=CZ-CH_2-S-SO_2-CH_3 + M.Hal$ wherein X, Y and Z retain the significance as above set forth and M refers to a positive salt forming group as exemplified by the alkali metals e.g. lithium, sodium, potassium etc., an ammonium radical which can be substituted by hydrocarbon radicals such as alkyl, aralkyl, aryl etc. or an onium radical wherein the quaternary nitrogen constitutes one of the hetero atoms of a basic heterocyclic ring system such as pyridinium, quinolinum, pyrrolidinium, picolinium and the like.

Although it is not necessary to employ a solvent for the reaction, it has been our finding that excellent results are achieved by condensing the haloallyl halide and the sodium salt of methanethiosulfonic acid in an organic solvent. Examples of the latter which have proved satisfactory include the lower alcohols, i.e. methyl alcohol or ethyl alcohol, propyl alcohols and butyl alcohols and so forth, lower saturated aliphatic ketones i.e. acetone, methyl ethyl ketone etc., normally liquid aliphatic and aromatic hydrocarbons as exemplified by pentane, heptane, octane, benzene, toluene, xylene and the like including the chlorinated derivatives of the above mentioned hydrocarbons as well as the common ether and ester solvents. Although it is the usual practice to effect the reaction using equal molar quantities of the reactants, it is within the scope of our invention to employ any molar ratio of reactants.

The following examples will serve for the purpose of illustrating the herein contemplated compounds of the invention and their preparation. However, it is to be understood that various ramifications and modifications of practicing the invention will be obvious to those skilled in the art without departing from the spirit and scope thereof.

EXAMPLE 1

*1,1-Dichloroallylmethanethiosulfonate*

$CCl_2=CH-CH_2SSO_2CH_3$ 23.0 g. of 1,1,3-trichloropropene, 20.1 g. of sodium methanethiosulfonate and 100 ml. of absolute alcohol were placed in a flask equipped with a stirrer and reflux condenser. This mixture was refluxed for 20 hours after which the precipitated solid was filtered off and the filtrate poured into water. A heavy oil was obtained which was separated and the aqueous portion extracted with 70 ml. of benzene. The oil and benzene extract were combined, dried over anhydrous magnesium sulfate and, after filtering off the dessicant, the filtrate was subjected to distillation under reduced pressure in order to remove the volatile solvent. The desired product was a residual yellow oil amounting to 25 g. and having an $N_D^{25}$ of 1.5544.

EXAMPLE 2

*2-Bromoallylmethanethiosulfonate*

$CH_2=CBr-CH_2-SSO_2CH_3$ 23.0 g. of 2,3-dibromopropene, 20.1 g. of sodium methanethiosulfonate and 100 ml. butanone were refluxed for 2 hours and the precipitated sodium bromide filtered off. After washing 3 times with water, the organic filtrate was dried over anhydrous magnesium sulfate, the dessicant filtered off and the solvent and volatile products removed by distillation at 100° C. in vacuo. The desired product was a residual yellow oil, obtained in essentially quantitative yield, having a $N_D^{25}$ of 1.5603.

EXAMPLE 3

*2-Chloroallylmethanethiosulfonate*

$CH_2=CCl-CH_2-SSO_2CH_3$ 20.0 g. of 2,3-dichloropropene, 20.1 g. of sodium methanethiosulfonate and 100 ml. of butanone were refluxed for 32 hours. The precipitated sodium bromide was then filtered off and the reaction mixture generally treated in the manner described for the prior examples. The product, in this instance, amounted to 21.5 g. and was a brown oil having a refractive index of 1.5358 when measured at 24° C.

EXAMPLE 4

*1-Chloroallylmethanethiosulfonate*

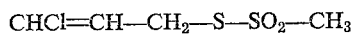

25.0 g. of 1,3-dichloropropene, 20.1 g. of sodium methanethiosulfonate and 100 ml. of n-butanol were refluxed for 3 hours and, after cooling, the precipitated sodium bromide was filtered off. From this point on, the reaction mixture was subjected to the same purification procedure as set forth in the previous examples. The desired product was obtained as a brown oil having a $N_D^{24}$ of 1.5272. The yield amounted to 72%.

The polyhalo propenes or haloallyl halides as used in the aforedescribed examples are known intermediates, the description and preparation of which can be found in the chemical literature. The methanethiosulfonic acid salts are likewise known entities and are commonly produced by reacting a methanesulfonyl halide with sodium sulfide. The detailed directions for this reaction can also be found by resorting to the chemical literature.

As above pointed out, the haloallyl methanethiosulfonates of the type contemplated herein, have been found to be effective in controlling a variety of pest organisms particularly various microorganisms of the type exemplified by *Aspergillus niger,* Penicillium, Rhizoctonia, Pythium and Fusarium. In addition to the previously enumerated organisms, the toxicants of the invention have been found useful for controlling nematodes in the soil. In preparing fungicidal compositions in which the active component thereof contains at least one of the compounds of the invention, the toxicant is diluted with a suitable adjunct of the type commonly employed for the purpose of formulating biocidal compositions. For instance, a solid composition may be prepared by mixing the toxicant with a suitable diluent such as talc, clay, diatomaceous earth or the like. These solid compositions can be used directly and are commonly applied in the form of a dusting spray. However, it may be desirable to use the above described solid compositions in the form of a liquid in which case they are formulated with a surfactant so the resulting powder is readily wetted when added to water, forming a suspension or dispersion of the solid particles in an aqueous medium.

On the other hand, the toxicant can be dissolved in an organic solvent and such solutions applied or used directly. Alternately, the solutions can be added to water, preferably in the presence of a surfactant in order to form a dispersion of the solid in the aqueous phase. In dissolving the toxicants, either a water miscible or a water immiscible solvent can be used. Examples of the former include the lower ketones such as acetone, methyl ethyl ketone and the like, while examples of the latter include kerosene, common Stoddard solvent, liquid aromatic hydrocarbons as exemplified by benzene, toluene, xylene solutions, various chlorinated derivatives of the aforementioned hydrocarbons; other suitable solvents include the aliphatic hydrocarbons, e.g. hectane, heptane, octane, chlorinated derivatives thereof as well as various esters and other type solvents.

Surfactants suitable for preparing dispersions as above mentioned include the anionic, cationic or nonionic types. Examples of these adjuncts are the sulfonated animal and vegetable oils, sulfonated petroleum oils, sodium lauryl sulfonate ethylene oxide condensation products of the type produced by reacting octyl phenol with ethylene oxide, higher alkyl pyridinium halides as exemplified by lauryl pyridinium bromide and cetyldimethylbenzyl ammonium chloride. In general, we have ascertained that excellent results ensue when the surface active agent constitutes about 1–15% by weight of the composition.

The following tests were carried out in evaluating compounds of this invention.

Fungi are tested in vitro by first partially filling 1 oz. bottles with a malt broth after which both the containers and the broth are sterilized. The compound to be tested is mixed with the malt broth at the desired concentration (expressed in parts per million; p.p.m.) and the bottles inoculated with a spore suspension of the desired fungus. The bottles are then sealed and held for one week after which the tests are examined and evaluated. The lowest concentration which prevents growth is usually taken as a definite concentration.

The fungus fumigation test is conducted by placing a micro beaker containing a sample of a compound undergoing tests in the center of a sterile petri dish containing an agar medium suitable for growing fungi. When the agar plate, as above arranged, is inoculated with fungi, the microorganisms will thus grow around the micro beaker and as close to it as the volatility and effectiveness of the compound will allow. The effectiveness in this test is expressed as the percent of the plate which is kept free of fungus growth.

The soil mix test is conducted by mixing the compound to be evaluated in soil which has been infected with fungi. The compound is, of course, incorporated in the soil in a known concentration in order to accurately determine its effectiveness against the microorganism. In the present case bean seeds were planted in soil which had been previously inoculated with the microorganisms and the growth of such bean plants compared to the growth of identical plants grown in untreated soil.

In determining nematocidal action in the soil, the compound undergoing test is combined with the infected soil which is then maintained in a sealed container for 48 hours. The soil is then transferred into paper containers and so maintained for one week in order that the soil may be completely aired out. At the end of this period, a tomato plant is transplanted into the soil and, after a period of approximately 3 weeks, the roots of the tomato plant are examined for the presence of knots or swelling which are indicative of nematode infection.

The results of the above described tests are set forth in the table below:

TABLE

| Compound | In vitro vial test | | | Agar Fumigation | Nematodes | Soil Fungicide | | |
| --- | --- | --- | --- | --- | --- | --- | --- | --- |
| | *Aspergillus niger* | Soil Fungi or Penicillium | *Escherichia coli* | | | Rhizoctonia | Fusarium | Pythium |
| 2 | [1] (5) | [1] (5) | >50 | 10 | [1] (110) | [1] (27) | 55 | (27) |
| 4 | [1] (5) | [1] (5) | >50 | 100 | [1] (110) | (110) | [1] (7) | 27 |
| 7 | (10) | (10) | >50 | 60 | [1] (110) | [1] (110) | (13) | 27 |
| 9 | [1] (5) | [1] (5) | >50 | 100 | [1] 110 | [1] (27) | 13 | 27 |

[1] Lowest concentration tested.
Figures without paranthesis indicate complete inhibition at that concentration in p.p.m.
Parenthesis indicate partial inhibition.

We claim:
1. A haloallyl methanethiosulfonate having the following formula:

$$CXY=CZ-CH_2-S-SO_2-CH_3$$

wherein X, Y and Z are selected from the class consisting of hydrogen, chlorine and bromine, at least one of said X, Y and Z always being chlorine or bromine.

2. A haloallyl methanethiosulfonate of the following formula:

$$CCl_2=CH-CH_2SSO_2CH_3$$

3. A haloallyl methanethiosulfonate of the following formula:

$$CH_2=CBr-CH_2-SSO_2CH_3$$

4. A haloallyl methanethiosulfonate of the following formula:

$$CH_2=CCl-CH_2-SSO_2CH_3$$

5. A haloallyl methanethiosulfonate of the following formula:

$$CHCl=CH-CH_2-S-SO_2-CH_3$$

References Cited in the file of this patent
UNITED STATES PATENTS

| | | |
|---|---|---|
| 2,877,258 | Hardy et al. | Mar. 10, 1959 |
| 2,892,861 | Doerr et al. | June 30, 1959 |
| 2,954,315 | Gorden et al. | Sept. 27, 1960 |
| 3,016,327 | Schmitz et al. | Jan. 9, 1962 |
| 3,047,393 | Herz et al. | July 31, 1962 |